US009588928B1

(12) United States Patent
Swartzentruber

(10) Patent No.: US 9,588,928 B1
(45) Date of Patent: Mar. 7, 2017

(54) UNIQUE PACKET MULTICAST PACKET READY COMMAND

(71) Applicant: Netronome Systems, Inc., Santa Clara, CA (US)

(72) Inventor: Ron Lamar Swartzentruber, Amesbury, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 307 days.

(21) Appl. No.: 14/530,759

(22) Filed: Nov. 2, 2014

(51) Int. Cl.
*G06F 13/36* (2006.01)
*G06F 13/40* (2006.01)
*G06F 3/06* (2006.01)

(52) U.S. Cl.
CPC ........ *G06F 13/4027* (2013.01); *G06F 3/0613* (2013.01); *G06F 3/0647* (2013.01); *G06F 3/0683* (2013.01)

(58) Field of Classification Search
None
See application file for complete search history.

(56) References Cited

U.S. PATENT DOCUMENTS

| 6,333,932 B1* | 12/2001 | Kobayasi | H04L 5/16 370/253 |
| 2003/0053434 A1* | 3/2003 | Chow | H04W 4/10 370/338 |
| 2003/0202506 A1* | 10/2003 | Perkins | H04L 29/06027 370/352 |
| 2009/0193315 A1* | 7/2009 | Gower | G06F 11/1004 714/758 |
| 2010/0061272 A1* | 3/2010 | Veillette | H04L 45/34 370/254 |

* cited by examiner

*Primary Examiner* — Michael Sun
(74) *Attorney, Agent, or Firm* — Imperium Patent Works LLP; T. Lester Wallace; Mark D. Marrello

(57) ABSTRACT

A method of performing an unique packet multicast packet ready command (unique packet multicast mode operation) is described herein. A packet ready command is received from a memory system via a bus and onto a network interface circuit. The packet ready command includes a multicast value. A communication mode is determined as a function of the multicast value. The multicast value indicates a plurality of packets are to be communicated to a plurality of destinations by the network interface circuit, and each of the plurality of packets are unique. A free packet command is output from the network interface circuit onto the bus. The free packet command includes a Free On Last Transfer (FOLT) value that indicates that the packets are to be freed from the memory system by the network interface circuit after the packets are communicated to the network interface circuit.

20 Claims, 20 Drawing Sheets

MULTICAST TRAFFIC MANAGER

MPLS ROUTER

MAC ISLAND
(INGRESS)

TRANSFERRED OVER MINIPACKET BUS

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 7

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| 16-BITS | QUEUE NUMBER: QUEUE TO WHICH THE PACKET BELONGS. ("QUEUE INDICATOR") |
| 8-BITS | I/O DESTINATION TO WHICH THE PACKET IS TO BE SENT. |
| 5-BITS | PACKET SEQUENCER IDENTIFICATION |
| 3-BITS | DROP PRECEDENCE VALUE |
| 1-BITS | PRIORITY INDICATOR (INDICATES IF PACKETS CAN BE DROPPED - OPTIONAL) |

EGRESS PACKET DESCRIPTOR

FIG. 8

ME ISLAND

MU ISLAND

NBI ISLAND
(EGRESS)

MULTICAST TRAFFIC MANAGER

MULTICAST TRAFFIC MANAGER STATE
MACHINE FLOWCHART

MULTICAST TRAFFIC MANAGER STATE
MACHINE FLOWCHART

MAC ISLAND
(EGRESS)

DROP PACKET MODE OPERATION

UNICAST PACKET MODE OPERATION

UNIQUE PACKET MULTICAST OPERATION

COMMON PACKET MULTICAST OPERATION

| SIGNAL | WIDTH (BITS) | DESCRIPTION |
|---|---|---|
| TARGET | 4 | CTM CPP TARGET ID |
| MNEMONIC | - | PE_COMPLETION |
| ACTION | 5 | 19 |
| TOKEN | 2 | [2;0]: *TOKEN |
| | | 00: DROP PACKET (USED FOR SEQUENCE NUMBER ONLY) |
| | | 01: UNICAST PACKET (FREE ON LAST TRANSFER) |
| | | 10: MULTICAST PACKET (DON'T FREE ON LAST TRANSFER) |
| | | 11: MULTICAST PACKET (FREE ON LAST TRANSFER) |
| LENGTH | 5 | When PM is enabled (Dataref[1;11]=0), lower 4 bits of Packet Start Offset: *8B Aligned (0=8, 1=16, ... 62=504) |
| | | When PM is disabled (Dataref[1;11]=1), lower 5 bits of Packet Start Offset: *4B Aligned (0=8, 1=12, 2=16, 3=20, ... 126=512) |
| BYTE MASK | 8 | [ 3; 5]: *DropPrecedence |
| | | [ 5; 0]: *SequencerNumber |
| ADDRESS | 40 | [2;38]: ***2b10 |
| | | [ 6;32]: ***CTM Island Number |
| | | [ 7;25]: Unused |
| | | [ 9;16]: Packet Number |
| | | [ 2;14]: Packet Start Byte Offset within 4B alignment when PM is disabled, unused when PM is enabled |
| | | [14; 0]: *Total Packet Length in Bytes |
| DATA MASTER ISLAND | 6 | [ 2; 4]: top 2 bits of Packet Start Offset |
| | | [ 4; 0]: *SequenceNumber[4;8] |
| DATA MASTER | 4 | [ 4; 0]: *SequenceNumber[4;4] |
| DATAREF | 14 | [ 2;12]: NBI Number |
| | | [ 1;11]: 0=PM enabled, 1=PM disabled |
| | | [ 1;10]: *Retry (Indicates this is a retry packet) |
| | | [10; 0]: *Tx Queue Number |
| SIGNAL MASTER | 8 | [ 4; 0]: *SequenceNumber[4;0] |
| SIGNALREF | 7 | UNUSED |
| * | | DON'T CARE FOR PACKET ENGINE |
| ** | | DON'T CARE FOR NBI TRAFFIC MANAGER |
| *** | | FIELDS USED FOR ROUTING COMMAND TO CTM |

PACKET PROCESSING COMPLETE COMMAND

FIG. 21

| SIGNAL | WIDTH (BITS) | DESCRIPTION |
|---|---|---|
| TARGET | 4 | CTM CPP TARGET ID |
| MNEMONIC | - | pe_free_packet/ pe_free_packet_and_signal/ pe_free_packet_and_return_pointer/ pe_return_pointer |
| ACTION | 5 | 19 |
| TOKEN | 2 | [2:0]; *TOKEN |
| | | 00: Free Packet and Don't Signal (pe_free_packet) |
| | | 01: Free Packet and Signal Only (pe_free_packet_and_signal) |
| | | 10: Free Packet and Return MU Pointer (pe_free_packet_and_return_pointer) |
| | | 11: Don't Free Packet and Return Pointer (pe_return_pointer) |
| LENGTH | 5 | [5:0] 5b0 |
| BYTE MASK | 8 | Don't Care |
| ADDRESS | 40 | [31:9] Don't Care |
| | | [9:0] Packet Number |
| DATA MASTER ISLAND | 6 | NBI Island ID |
| DATA MASTER | 4 | ME/Traffic Manager Master ID |
| DATAREF | 14 | Data Reference for Transfer |
| SIGNAL MASTER | 8 | ME/TM Signal Master |
| SIGNALREF | 7 | ME/TM Signal Ref |

FREE PACKET COMMAND

FIG. 22

| SIGNAL | WIDTH (BITS) | DESCRIPTION |
|---|---|---|
| TARGET | 4 | NBI Target ID |
| MNEMONIC | - | - |
| ACTION | 5 | 3 |
| TOKEN | 2 | [2;0]: *TOKEN |
| | | 00: DROP PACKET (USED FOR SEQUENCE NUMBER ONLY) |
| | | 01: UNICAST PACKET (FREE ON LAST TRANSFER) |
| | | 10: MULTICAST PACKET (DON'T FREE ON LAST TRANSFER) |
| | | 11: MULTICAST PACKET (FREE ON LAST TRANSFER) |
| LENGTH | 5 | When PM is enabled (Dataref[1;11]=0), lower 4 bits of Packet Start Offset: *8B Aligned (0=8, 1=16, ... 62=504) |
| | | When PM is disabled (Dataref[1;11]=1), lower 5 bits of Packet Start Offset: *4B Aligned (0=8, 1=12, 2=16, 3=20, ... 126=512) |
| BYTE MASK | 8 | [ 3; 5]: *DropPrecedence |
| | | [ 5; 0]: *SequencerNumber |
| ADDRESS | 40 | [ 2;38]: NBI Number |
| | | [ 6;32]: ***CTM's Data Master Island |
| | | [ 4;28]: ***CTM's Data Master |
| | | [ 2;26]: Unused |
| | | [ 1;25]: Packet Number[9]=0 |
| | | [ 2;14]: Packet Start Byte Offset within 4B alignment when PM is disabled, unused when PM is enabled |
| | | [14; 0]: *Total Packet Length in Bytes |
| DATA MASTER ISLAND | 6 | [ 2; 4]: Top 2 bits of Packet Start Offset |
| | | [ 4; 0]: *SequenceNumber[4;8] |
| DATA MASTER | 4 | [ 4; 0]: *SequenceNumber[4;4] |
| DATAREF | 14 | [ 2;12]: ***CTM Packet Length (0 = 256B; 1 = 512B; 2 = 1KB; 3 = 2KB) |
| | | [ 1;11]: 0=PM enabled, 1=PM disabled |
| | | [ 1;10]: *Retry (Indicates this is a retry packet) |
| | | [10; 0]: *Tx Queue Number |
| SIGNAL MASTER | 8 | [ 4; 0]: *SequenceNumber[4;0] |
| SIGNALREF | 7 | UNUSED |
| * | | DON'T CARE FOR PACKET ENGINE |
| ** | | DON'T CARE FOR NBI TRAFFIC MANAGER |
| *** | | Packet Engine Adds These |

PACKET READY COMMAND

FIG. 23

UNIQUE PACKET MULTICAST PACKET READY COMMAND

TECHNICAL FIELD

The described embodiments relate generally to managing memory allocation and more specifically to managing memory allocation for packet data processing within the network flow processor.

SUMMARY

In a first novel aspect, a packet ready command is received from a first memory system via a bus and onto a network interface circuit. The packet ready command includes a multicast value. A communication mode is determined as a function of the multicast value. The multicast value indicates a single packet is to be communicated by the network interface circuit to a first number of destinations. A free packet command is output from the network interface circuit onto the bus. The free packet command includes a Free On Last Transfer (FOLT) value that indicates that the packet will not be freed from the first memory system by the network interface circuit once the packet is transmitted.

In a second novel aspect, a packet ready command is received from a memory system via a bus and onto a network interface circuit. The packet ready command includes a multicast value. A communication mode is determined as a function of the multicast value. The multicast value indicates a plurality of packets are to be communicated to a plurality of destinations by the network interface circuit, and each of the plurality of packets are unique. A free packet command is output from the network interface circuit onto the bus. The free packet command includes a Free On Last Transfer (FOLT) value that indicates that the packets are to be freed from the memory system by the network interface circuit after the packets are communicated to the network interface circuit.

In a third novel aspect, a packet ready command is received from a memory system via a bus and onto a network interface circuit. The packet ready command includes a multicast value. A communication mode is determined as a function of the multicast value. The multicast value indicates a single packet is to be communicated to a single destination by the network interface circuit. A free packet command is outputted from the network interface circuit onto the bus. The free packet command includes a Free On Last Transfer (FOLT) value that indicates that the packet is to be freed from the memory system by the network interface circuit after the packet is communicated to the network interface circuit.

In a fourth novel aspect, a first packet ready command is received from a memory system via a bus and onto a first network interface circuit. The first packet ready command includes a multicast value. A first communication mode is determined as a function of the multicast value. The multicast value indicates a single packet was communicated by a second network interface circuit. A packet sequence number stored in a memory unit is updated. The memory unit is included in the first network interface circuit. The first network interface circuit does not free the first packet from the memory system.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table that sets forth the parts of an ingress packet descriptor.

FIG. 8 is a table that sets forth the parts of an egress packet descriptor.

FIG. 21 is a table illustrating the contents of a packet processing complete command.

FIG. 22 is a table illustrating the contents of a free packet command.

FIG. 23 is a table illustrating the contents of a packet ready command.

DETAILED DESCRIPTION

Reference will now be made in detail to background examples and some embodiments of the invention, examples of which are illustrated in the accompanying drawings. In the description and claims below, relational terms such as "horizontal", "vertical", "lateral", "top", "upper", "bottom", "lower", "right", "left", "over" and "under" may be used to describe relative orientations between different parts of a structure being described, and it is to be understood that the overall structure being described can actually be oriented in any way in three-dimensional space.

Figure 1:
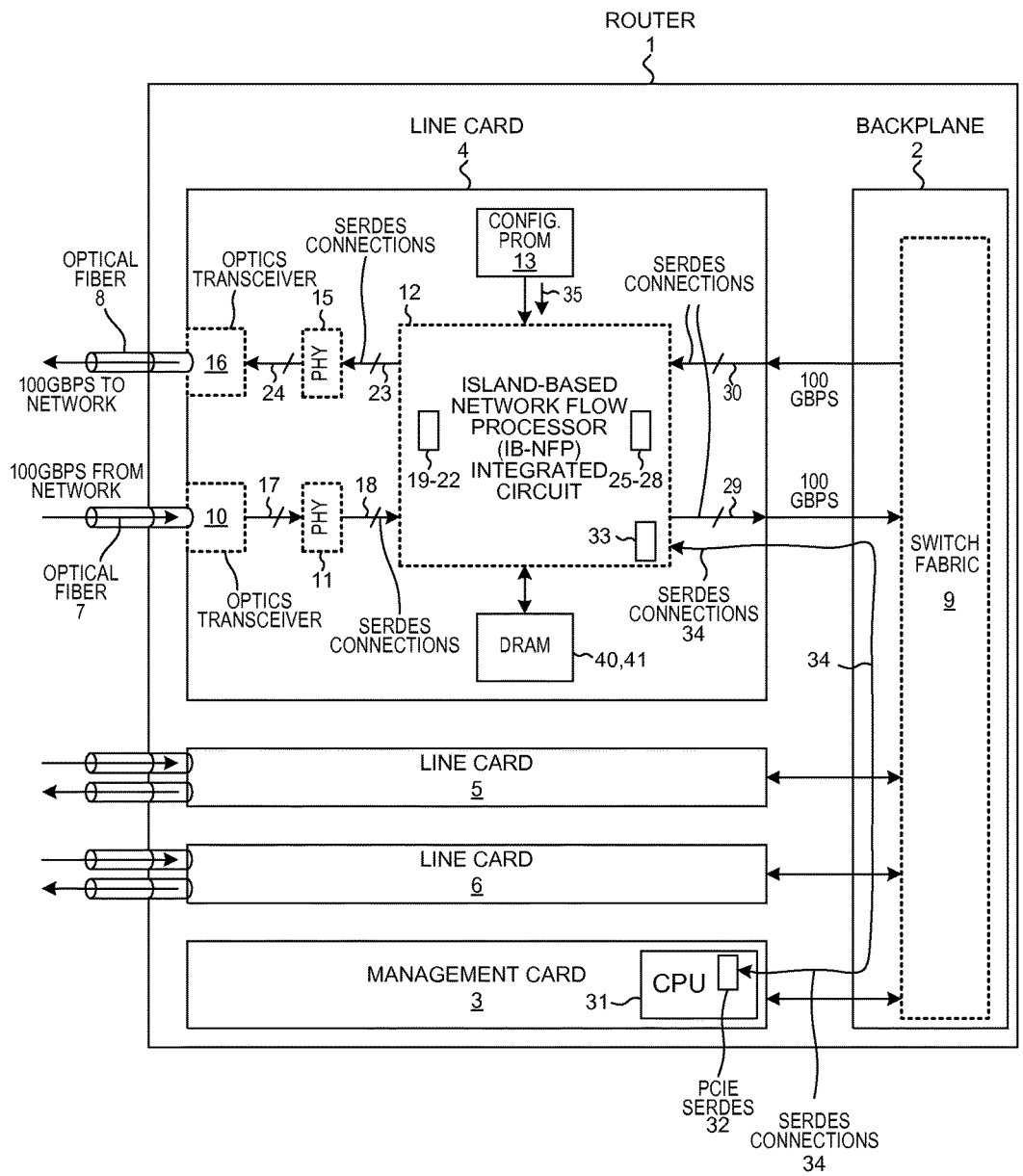
FIG. 1 is a simplified diagram of an MPLS (MultiProtocol Label Switching) router 1.

FIG. 1 is a simplified diagram of an MPLS (MultiProtocol Label Switching) router 1. Router 1 includes a backplane 2, a management card 3, and line cards 4-6. Each of the line cards can receive 100 Gbps (gigabits per second) packet traffic from another network via a fiber optic cable 7 and also can transmit 100 Gbps packet traffic to another network via another fiber optic cable 8. In addition, each line card can receive 100 Gbps packet traffic from the switch fabric 9 of the backplane and can also transmit 100 Gbps packet traffic to the switch fabric. Line cards 4-6 are of identical construction. In this example, flows of packets are received into line card 4 from a network via the fiber optic cable 7 or from the switch fabric 9. Certain functions then need to be performed on the line card including looking up MPLS labels, determining destinations for incoming flows of packets, and scheduling the transmitting of flows of packets. Packets of the flows pass from the line card 4 and out either to the network via optical cable 8 or to the switch fabric 9.

Line card 4 includes a first optical transceiver 10, a first PHY integrated circuit 11, an Island-Based Network Flow Processor (IB-NFP) integrated circuit 12, a configuration Programmable Read Only Memory (PROM) 13, an external memory such as Dynamic Random Access Memory (DRAM) 40-41, a second PHY integrated circuit 15, and a second optical transceiver 16. Packet data received from the network via optical cable 7 is converted into electrical signals by optical transceiver 10. PHY integrated circuit 11 receives the packet data in electrical form from optical transceiver 10 via connections 17 and forwards the packet data to the IB-NFP integrated circuit 12 via SerDes connections 18. In one example, the flows of packets into the IB-NFP integrated circuit from optical cable 7 is 100 Gbps traffic. A set of four SerDes circuits 19-22 within the IB-NFP integrated circuit 12 receives the packet data in serialized form from SerDes connections 18, deserializes the packet data, and outputs packet data in deserialized form to digital circuitry within IB-NFP integrated circuit 12.

Similarly, IB-NFP integrated circuit 12 may output 100 Gbps packet traffic to optical cable 8. The set of four SerDes circuits 19-22 within the IB-NFP integrated circuit 12 receives the packet data in deserialized form from digital circuitry within integrated circuit 12. The four SerDes circuits 19-22 output the packet data in serialized form onto SerDes connections 23. PHY 15 receives the serialized form packet data from SerDes connections 23 and supplies the packet data via connections 24 to optical transceiver 16. Optical transceiver 16 converts the packet data into optical form and drives the optical signals through optical cable 8. Accordingly, the same set of four duplex SerDes circuits 19-22 within the IB-NFP integrated circuit 12 communicates packet data both into and out of the IB-NFP integrated circuit 12.

IB-NFP integrated circuit 12 can also output packet data to switch fabric 9. Another set of four duplex SerDes circuits 25-28 within IB-NFP integrated circuit 12 receives the packet data in deserialized form, and serializes the packet data, and supplies the packet data in serialized form to switch fabric 9 via SerDes connections 29. Packet data from switch fabric 9 in serialized form can pass from the switch fabric via SerDes connections 30 into the IB-NFP integrated circuit 12 and to the set of four SerDes circuits 25-28. SerDes circuits 25-28 convert the packet data from serialized form into deserialized form for subsequent processing by digital circuitry within the IB-NFP integrated circuit 12.

Management card 3 includes a CPU (Central Processing Unit) 31. CPU 31 handles router management functions including the configuring of the IB-NFP integrated circuits on the various line cards 4-6. CPU 31 communicates with the IB-NFP integrated circuits via dedicated PCIE connections. CPU 31 includes a PCIE SerDes circuit 32. IB-NFP integrated circuit 12 also includes a PCIE SerDes 33. The configuration information passes from CPU 31 to IB-NFP integrated circuit 12 via SerDes circuit 32, SerDes connections 34 on the backplane, and the PCIE SerDes circuit 33 within the IB-NFP integrated circuit 12. External configuration PROM (Programmable Read Only Memory) integrated circuit 13 stores other types of configuration information such as information that configures various lookup tables on the IB-NFP integrated circuit. This configuration information 35 is loaded into the IB-NFP integrated circuit 12 upon power up. As is explained in further detail below, IB-NFP integrated circuit 12 can store various types of information including buffered packet data in external DRAM integrated circuits 40-41.

Figure 2:
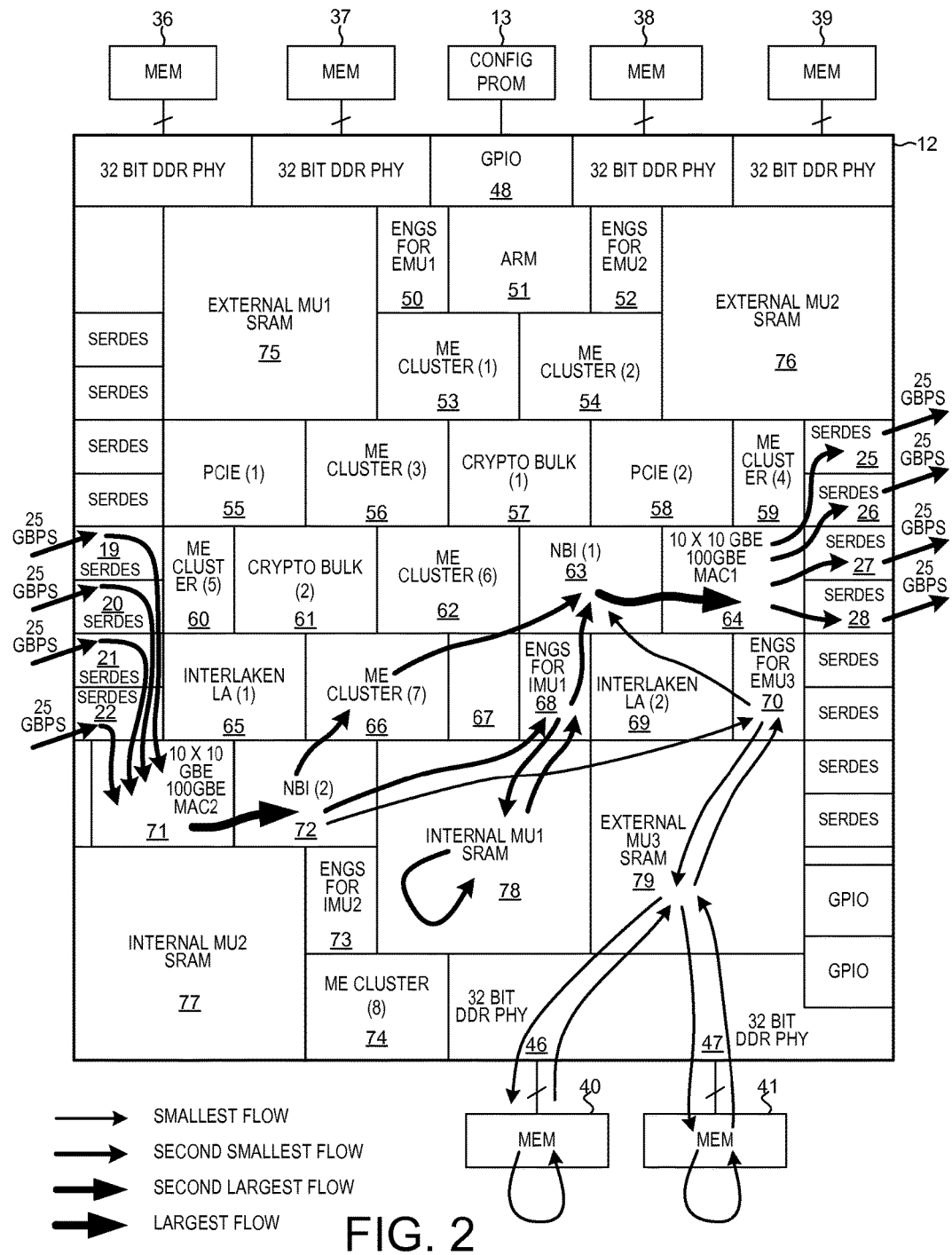
FIG. 2 is a schematic diagram that illustrates an operational example of IB-NFP integrated circuit 12 within the MPLS router 1 of FIG. 1.

FIG. 2 is a schematic diagram that illustrates an operational example of IB-NFP integrated circuit 12 within the MPLS router 1 of FIG. 1. 100 Gbps packet traffic is received via optical cable 7 (see FIG. 1), flows through optics transceiver 10, flows through PHY integrated circuit 11, and is received onto IB-NFP integrated circuit 12 spread across the four SerDes I/O blocks 19-22. Twelve virtual input ports are provided at this interface in the example of FIG. 1. The symbols pass through direct dedicated conductors from the SerDes blocks 19-22 to ingress MAC island 71. Ingress MAC island 71 converts successive symbols delivered by the physical coding layer into packets by mapping symbols to octets, by performing packet framing, and then by buffering the resulting packets for subsequent communication to other processing circuitry. The packets are communicated from MAC island 71 across a private inter-island bus to ingress NBI (Network Bus Interface) island 72. Although dedicated connections are provided for this purpose in the particular example described here, in other examples the packets are communicated from ingress MAC island 71 to ingress NBI island via the configurable mesh data bus.

For each packet, the functional circuitry of ingress NBI island 72 examines fields in the header portion to determine what storage strategy to use to place the packet into memory. In one example, the NBI island examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP.

In the operational example of FIG. 2, NBI island 72 examines a packet header, performs packet preclassification, determines that the packet is a fast-path packet, and determines that the header portion of the packet should be placed into a CTM (Cluster Target Memory) in ME (Microengine) island 66. The header portion of the packet is therefore communicated across the configurable mesh data bus from NBI island 72 to ME island 66. The CTM is tightly coupled to the ME. The ME island 66 determines header modification and queuing strategy for the packet based on the packet flow (derived from packet header and contents) and the ME island 66 informs a second NBI island 63 of these. In this simplified example being described, the payload portions of fast-path packets are placed into internal SRAM (Static Random Access Memory) MU block 78 and the payload portions of exception packets are placed into external DRAM 40 and 41.

Half island 68 is an interface island through which all information passing into, and out of, SRAM MU block 78 passes. The functional circuitry within half island 68 serves as the interface and control circuitry for the SRAM within block 78. For simplicity purposes in the discussion below, both half island 68 and MU block 78 may be referred to together as the MU island, although it is to be understood that MU block 78 is actually not an island as the term is used here but rather is a block. In one example, MU block 78 is an amount of so-called "IP" that is designed and supplied commercially by a commercial entity other than the commercial entity that designs and lays out the IB-NFP integrated circuit. The area occupied by block 78 is a keep out area for the designer of the IB-NFP in that the substantially all the wiring and all the transistors in block 78 are laid out by the memory compiler and are part of the SRAM. Accordingly, the mesh buses and associated crossbar switches of the configurable mesh data bus, the mesh control bus, and the mesh event bus do not pass into the area of block 78. No transistors of the mesh buses are present in block 78. There is an interface portion of the SRAM circuitry of block 78 that is connected by short direct metal connections to circuitry in half island 68. The data bus, control bus, and event bus structures pass into and over the half island 68, and through the half island couple to the interface circuitry in block 78. Accordingly, the payload portion of the incoming fast-path packet is communicated from NBI island 72, across the configurable mesh data bus to SRAM control island 68, and from control island 68, to the interface circuitry in block 78, and to the internal SRAM circuitry of block 78. The internal SRAM of block 78 stores the payloads so that they can be accessed for flow determination by the ME island.

In addition, a preclassifier in the ingress NBI island determines that the payload portions for others of the packets should be stored in external DRAM 40 and 41. For example, the payload portions for exception packets are stored in external DRAM 40 and 41. Interface island 70, IP block 79, and DDR PHY I/O blocks 46 and 47 serve as the interface and control for external DRAM integrated circuits 40 and 41. The payload portions of the exception packets are therefore communicated across the configurable mesh data bus from NBI island 72, to interface and control island 70, to external MU SRAM block 79, to 32-bit DDR PHY I/O blocks 46 and 47, and to external DRAM integrated circuits 40 and 41. At this point in the operational example, the packet header portions and their associated payload portions are stored in different places. The payload portions of fast-path packets are stored in internal SRAM in MU block 78, whereas the payload portions of exception packets are stored in external SRAM in external DRAMs 40 and 41.

ME island 66 informs second NBI island 63 where the packet headers and the packet payloads can be found and provides the second NBI island 63 with an egress packet descriptor for each packet. The egress packet descriptor indicates a queuing strategy to be used on the packet. Second NBI island 63 uses the egress packet descriptor to read the packet headers and any header modification from ME island 66 and to read the packet payloads from either internal SRAM 78 or external DRAMs 40 and 41. Second NBI island 63 places packet descriptors for packets to be output into the correct order. For each packet that is then scheduled to be transmitted, the second NBI island uses the packet descriptor to read the header portion and any header modification and the payload portion and to assemble the packet to be transmitted. Note that the header modification is not actually part of the egress packet descriptor, but rather it is stored with the packet header by the ME when the packet is presented to the NBI. The second NBI island then performs any indicated packet modification on the packet. The resulting modified packet then passes from second NBI island 63 and to egress MAC island 64.

Egress MAC island 64 buffers the packets, and converts them into symbols. The symbols are then delivered by conductors from the MAC island 64 to the four SerDes I/O blocks 25-28. From SerDes I/O blocks 25-28, the 100 Gbps outgoing packet flow passes out of the IB-NFP integrated circuit 12 and across SerDes connections 34 (see FIG. 1) and to switch fabric 9. Twelve virtual output ports are provided in the example of FIG. 1.

Figure 3:
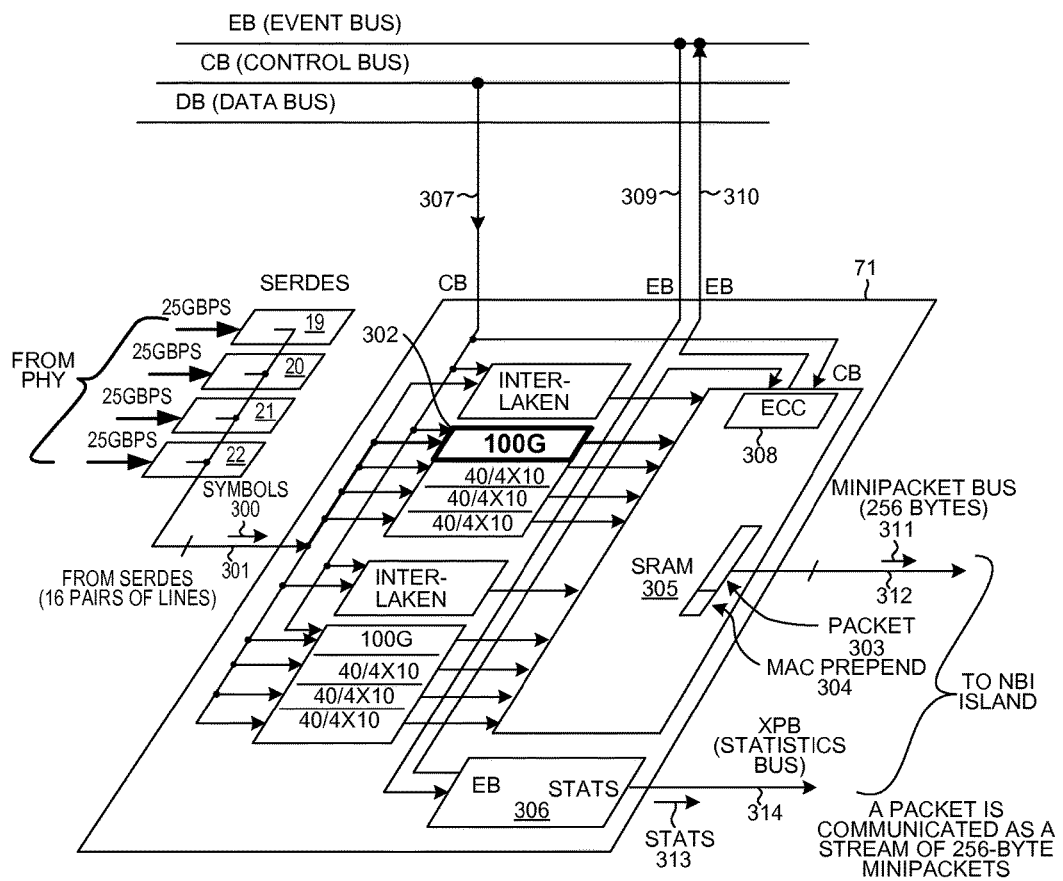
FIG. 3 is a diagram of the four SerDes I/O blocks 19-22 and the ingress MAC island 71 of IB-NFP integrated circuit 12.

FIG. 3 is a diagram of the four SerDes I/O blocks 19-22 and the ingress MAC island 71. The symbols 300 pass from the four SerDes I/O blocks and to the ingress MAC island across dedicated conductors 301. The symbols are converted into packets by a 100 Gbps ethernet block 302. The 100 Gbps ethernet block 302 analyzes the packets and places the results in this analysis at the beginning of the packet in the form of a "MAC prepend" value. The resulting packets and associated MAC prepend values are then buffered in SRAM 305. Reference numeral 303 identifies a part of the block that represents one packet and reference numeral 304 identifies a part of the block that represents the MAC prepend value. The MAC prepend value 304 includes: 1) an indication of the length of the packet, 2) an indication whether the packet is an IP packet, 3) and indication of whether the checksums are correct, and 4) a time stamp indicating when the packet was received.

As packets are loaded into SRAM, a statistics block 306 counts the number of packets that meet certain criteria. Various sub-circuits of the ingress MAC island are configurable. The input conductors 307 labeled CB couples the certain portions of the MAC island to the control bus tree so that these portions receive configuration information from the root of control bus tree. SRAM block 305 includes error detection and correction circuitry (ECC) 308. Error information detected and collected by ECC block 308 and statistics block 306 is reported through the local event bus and global event chain back to the ARM island 51. Ingress MAC island 71 is part of one of the local event rings. Event packets are circulated into the MAC island via conductors 309 and are circulated out of the MAC island via conductors 310. Packets that are buffered in SRAM 305 are then output from the MAC island to the ingress NBI island 72 in the form of one or more 256 byte minipackets 311 communicated across dedicated connections 312. Statistics information 313 is also communicated to the ingress NBI island 72 via dedicated connections 314.

Figure 4:
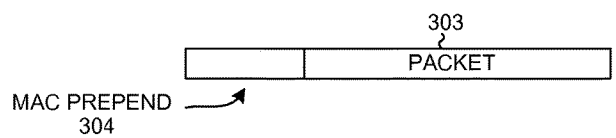
FIG. 4 is a diagram that illustrates how a packet is communicated as a sequence of minipackets across connections 312.

FIG. 4 is a diagram of packet 303 communicated across connections 312.

Figures 5, 6:
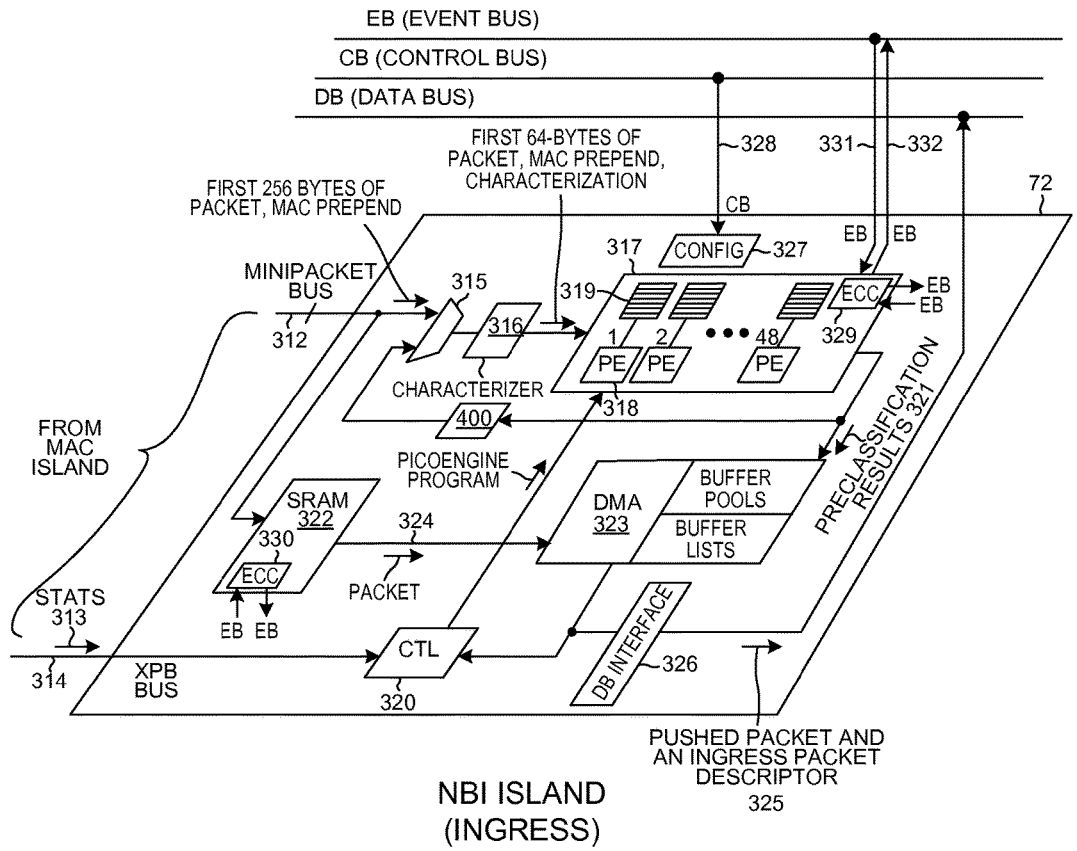
FIG. 5 is a diagram of ingress NBI island 72.
FIG. 6 is a table that sets forth the parts of preclassification results 321.

FIG. 5 is a diagram of ingress NBI island 72. Ingress NBI island 72 receives the MAC prepend and the minipackets via dedicated connections 312 from the ingress MAC island 72. The first 256 bytes of the packet and the MAC prepend pass through multiplexing circuitry 315 and to a characterizer 316. Characterizer 316 outputs characterization information, the first sixty-four bytes of the packet, and the MAC prepend. This is passed to a pool 317 of forty-eight picoengines. Each picoengine executes a program stored in an associated instruction control store. Reference numeral 318 identifies the first picoengine and reference numeral 319 identifies its instruction control store. The program in the instruction control store for each picoengine can be updated and changed under software control via control block 320. Control block 320 is also usable to receive the statistics information 313 from the MAC island via XPB bus connections 314. To perform deeper and deeper analysis into the header structure of an incoming packet, the output of the pool 317 can be passed back through a tunnel recirculation path and tunnel recirculation FIFO 400 to the characterizer 316 in an iterative fashion. Pool 317 outputs preclassification results 321.

FIG. 6 is a table that sets forth the part of preclassification results 321. The preclassification results 321 include: 1) a determination of which one of multiple buffer pools to use to store the packet, 2) a sequence number for the packet in a particular flow of packets through the IB-NFP, and 3) user metadata. The user metadata is typically a code generated by the picoengines, where the code communicates certain information about the packet. In the present operational example, the user metadata includes a bit. If the bit is set then the packet was determined to be of a first type (an exception packet), whereas if the bit is not set then the packet was determined to be of a second type (a fast-path packet).

The packet is buffered in SRAM 322. A buffer pool is a set of targets in ME islands where header portions can be placed. A buffer list is a list of memory addresses where payload portions can be placed. DMA engine 323 can read the packet out of SRAM via conductors 324, then use the buffer pools to determine a destination to which the packet header is to be DMA transferred, and use the buffer lists to determine a destination to which the packet payload is to be DMA transferred. The DMA transfers occur across the configurable mesh data bus. In the case of the exception packet of this example the preclassification user metadata and buffer pool number indicate to the DMA engine that the packet is an exception packet and this causes a first buffer pool and a first different buffer list to be used, whereas in the case of the fast-path packet the preclassification user metadata and buffer pool number indicate to the DMA engine that the packet is a fast-path packet and this causes a second buffer pool and a second buffer list to be used. Block 326 is data bus interface circuitry through which the configurable mesh data bus in accessed. Arrow 325 represents packets that are DMA transferred out of the NBI island 72 by DMA engine 323. Each packet is output with a corresponding ingress packet descriptor.

FIG. 7 is a table that sets forth the parts of an ingress packet descriptor. An ingress packet descriptor includes: 1) an address indicating where and in which ME island the header portion is stored, 2) an address indicating where and in which MU island the payload portion is, 3) how long the packet is, 4) a sequence number for the flow to which the packet belongs, 5) user metadata.

The programs stored in the instruction stores that are executable by the picoengines can be changed multiple times a second as the router operates. Configuration block 327 receives configuration information from the control bus CB tree via connections 328 and supplies the configuration information to various ones of the sub-circuits of NBI island 72 that are configurable. Error detection and correction (ECC) circuitry 329 collects error information such as errors detected in the contents of the instruction stores. ECC circuitry 329 and ECC circuitry 330 are coupled via connections 331 and 332 and other internal island connections not shown to be part of the local event ring of which the ingress MAC island 72 is a part.

Figure 9:
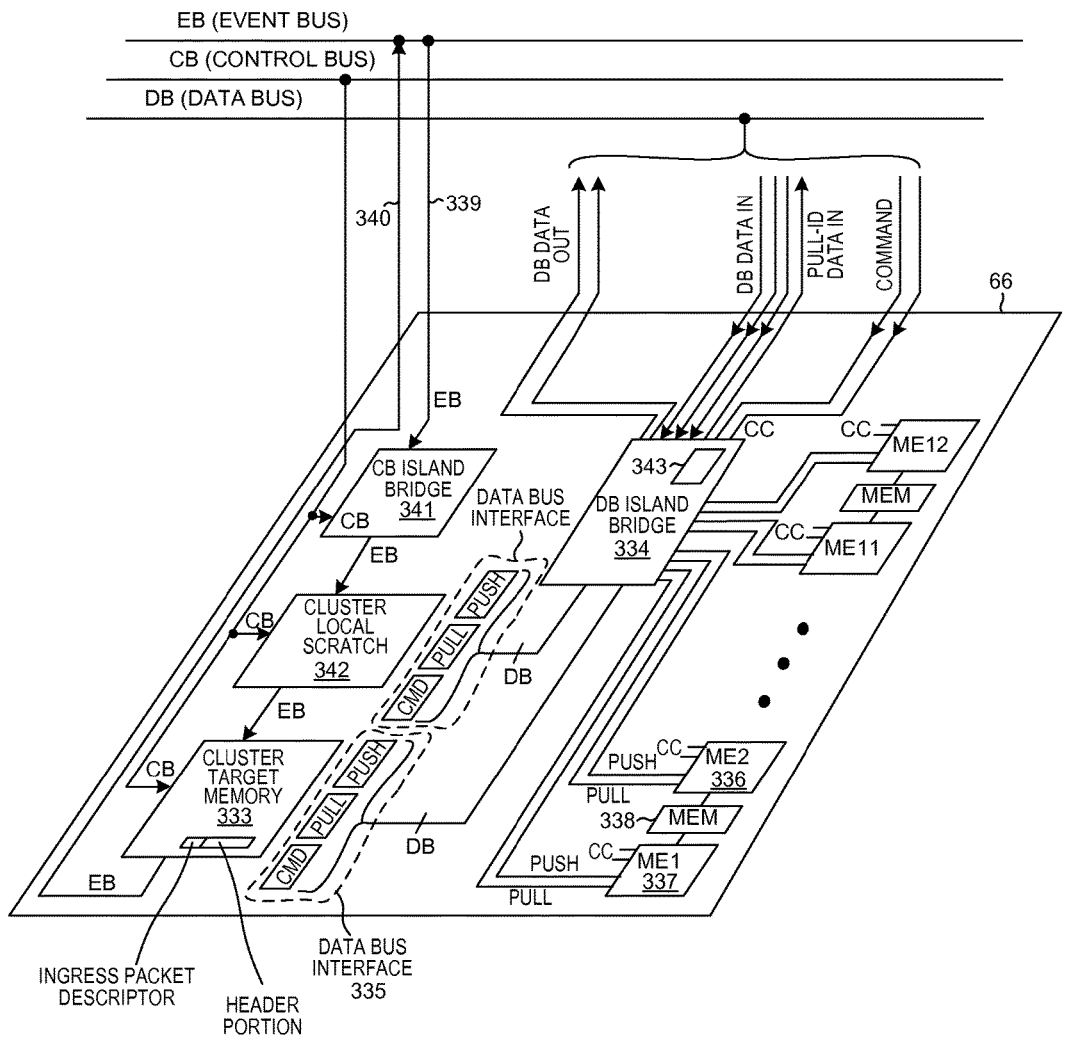
FIG. 9 is a diagram of the microengine (ME) island 66.

FIG. 9 is a diagram of the microengine (ME) island 66. In the present operational example, packet headers and the associated preclassification results are DMA transferred from the ingress NBI island 72 across the configurable mesh data bus and into the Cluster Target Memory (CTM) 333 of the ME island 66. The DMA engine 323 in the ingress NBI island is the master and the CTM 333 is the target for this transfer. The packet header portions and the associated ingress packet descriptors pass into the ME island via data bus island bridge 334 and data bus interface circuitry 335. Once in the CTM 333, the header portions are analyzed by one or more microengines. The microengines have, through the DB island bridge 334, a command out interface, a pull-id in interface, a pull-data out interface, and a push data in interface. There are six pairs of microengines, with each pair sharing a memory containing program code for the microengines. Reference numerals 336 and 337 identify the first pair of picoengines and reference numeral 338 identifies the shared memory. As a result of analysis and processing, the microengines modify each ingress packet descriptor to be an egress packet descriptor as shown in FIG. 8. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is, 8) packet sequencer identification to be used by the reorder block in determining in-order packet transmissions, 9) a drop precedence value that indicates a variable drop probability for a instantaneous queue depth range, and 10) a priority indicator that indicates if the packet associated with the packet descriptor is a high priority packet or a low priority packet. One example of a high priority packet is a control plane packet. Another example of a high priority packet is a maintenance packet. On the contrary, one example of a low priority packet is an HTTP packet.

Memory errors and other events detected in the ME island are reported via a local event ring and the global event chain back to the ARM island 51. A local event ring is made to snake through the ME island for this purpose. Event packets from the local event chain are received via connections 339 and event packets are supplied out to the local event chain via connections 340. The CB island bridge 341, the cluster local scratch 342, and CTM 333 can be configured and are therefore coupled to the control bus CB via connections 343 so that they can receive configuration information from the control bus CB.

A microengine within the ME island can use data bus commands to interact with a target, regardless of whether the target is located locally on the same ME island as the microengine or whether the target is located remotely in another island, using the same configurable data bus communications. If the target is local within the ME island, then the microengine uses data bus commands and operations as described above as if the memory were outside the island in another island, except that bus transaction values do not have a final destination value. The bus transaction values do not leave the ME island and therefore do not need the final destination information. If, on the other hand, the target is not local within the ME island then intelligence 343 within the DB island bridge adds the final destination value before the bus transaction value is sent out onto the configurable mesh data bus. From the perspective of the microengine master, the interaction with the target has the same protocol and command and data format regardless of whether the target is local or remote.

Figure 10:
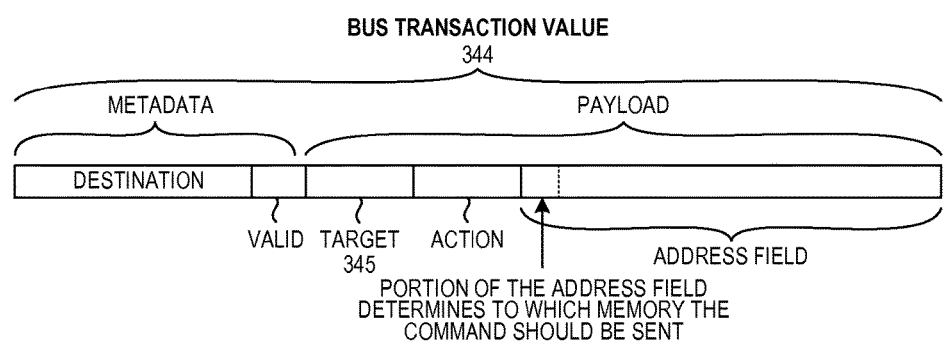
FIG. 10 is a bit sequence map of a bus transaction value used to communicate packet data from the ingress NBI island 72 to the ME island 66 across the CPP data bus.

FIG. 10 is a diagram of a bus transaction value 344 used to communicate packet data from the ingress NBI island 72 to the ME island 66. In a multi-target island such as the ME island 66, the target field 345 of the bus transaction value contains a number that indicates which target it is that is to receive the payload of the bus transaction value. In the present example, the header portions of the incoming 100 Gbps flow are written into CTM 333.

Figure 11:
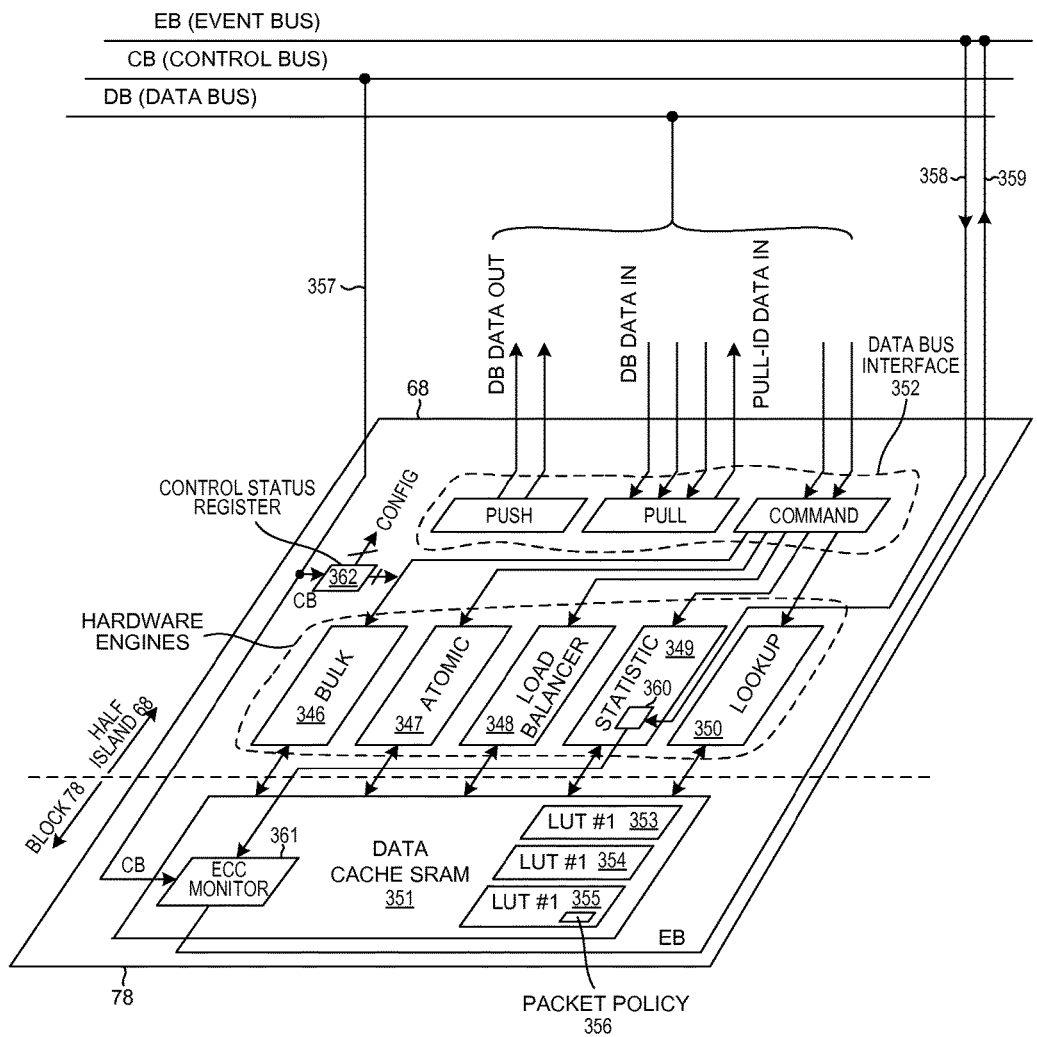
FIG. 11 is a diagram of MU half island 68 and associated SRAM block 78.

FIG. 11 is a diagram of MU half island 68 and SRAM block 78. MU half island 68 includes several hardware engines 350. In the operational example, packet payloads are DMA transferred directly from ingress NBI island 72 and across the configurable mesh data bus, through data bus interface 352 of half island 68, and into the data cache SRAM 351 block 78. The ingress NBI DMA engine 323 issues a bulk write command across the configurable mesh data bus to the bulk transfer engine 346. The destination is the MU island. The action is bulk write. The address where the data is to be written into the MU island is the address taken out of the appropriate buffer list. The bulk write command received at the MU is a bulk write, so the data bus interface 352 presents the command to the bulk engine. The bulk engine examines the command which is a write. In order to perform a write the bulk engine needs data, so the bulk engine issues a pull-id through the pull portion of interface 352, which in turn issues a pull-id back onto the configurable mesh data bus. The NBI DMA engine 323 receives the pull-id. Part of the pull-id is a data reference which indicates to the DMA engine which part of the packet is being requested as data. The DMA engine uses the data reference to read the requested part of the packet, and presents that across the data part of the data bus back to the bulk engine 346. The bulk engine 346 then has the write command and the packet data. The bulk engine 346 ties the two together, and it then writes the packet data into the SRAM 351 at the address given in the write command. In this way, packet payload portions pass from DMA engine in the ingress NBI island, across the configurable mesh data bus, through the data bus interface 352, through a bulk transfer engine 346, and into data cache SRAM 351.

In the present operational example, a microengine in the ME island 66 issues a lookup command across the configurable mesh data bus to have lookup hardware engine 350 examine tables in SRAM 351 for the presence of given data. The data to be looked for in this case is a particular MPLS label. The lookup command as received onto the MU island is a lookup command so the data base interface 352 presents the lookup command to the lookup engine. The lookup command includes a table descriptor of what part to memory to look in. The lookup command also contains a pull-id reference indicating what to look for (the MPLS label in this case). The data to look for is actually stored in transfer registers of the originating microengine. The lookup engine 350 therefore issues a pull-id out onto the configurable mesh data bus request back to the originating microengine. The microengine returns the requested data (the MPLS label to look for) corresponding to the reference id. The lookup engine now has the lookup command, the table descriptor, and the MPLS label that it is to look for. In the illustration there are three tables 353-355. A table description identifies one such table by indicating the starting address of the table in SRAM 351, and how large the table is. If the lookup operation is successful in that the lookup hardware engine 350 finds the MPLS label in the table identified by the table descriptor, then the lookup hardware engine 350 returns a predetermined value "Packet Policy" 356 back to the requesting microengine. A packet policy is a code that indicates: 1) a header modification to be done, and 2) a queuing strategy to use. Lookup engine 350 returns the packet policy 356 to the originating microengine by pushing the data (the packet policy) via the push interface of the configurable mesh data bus.

Various parts of the MU island are configurable by changing the contents of registers and memory via the control bus CB and connections 357 and control status registers 362. Errors detected on the MU island by circuits 360 and 361 are reported into a local event ring. Event packets from the local event ring are received via input connections 358 and the MU island outputs event packets to the local even ring via output connections 359. Various sub-circuits of the MU island are configurable.

Figure 12:
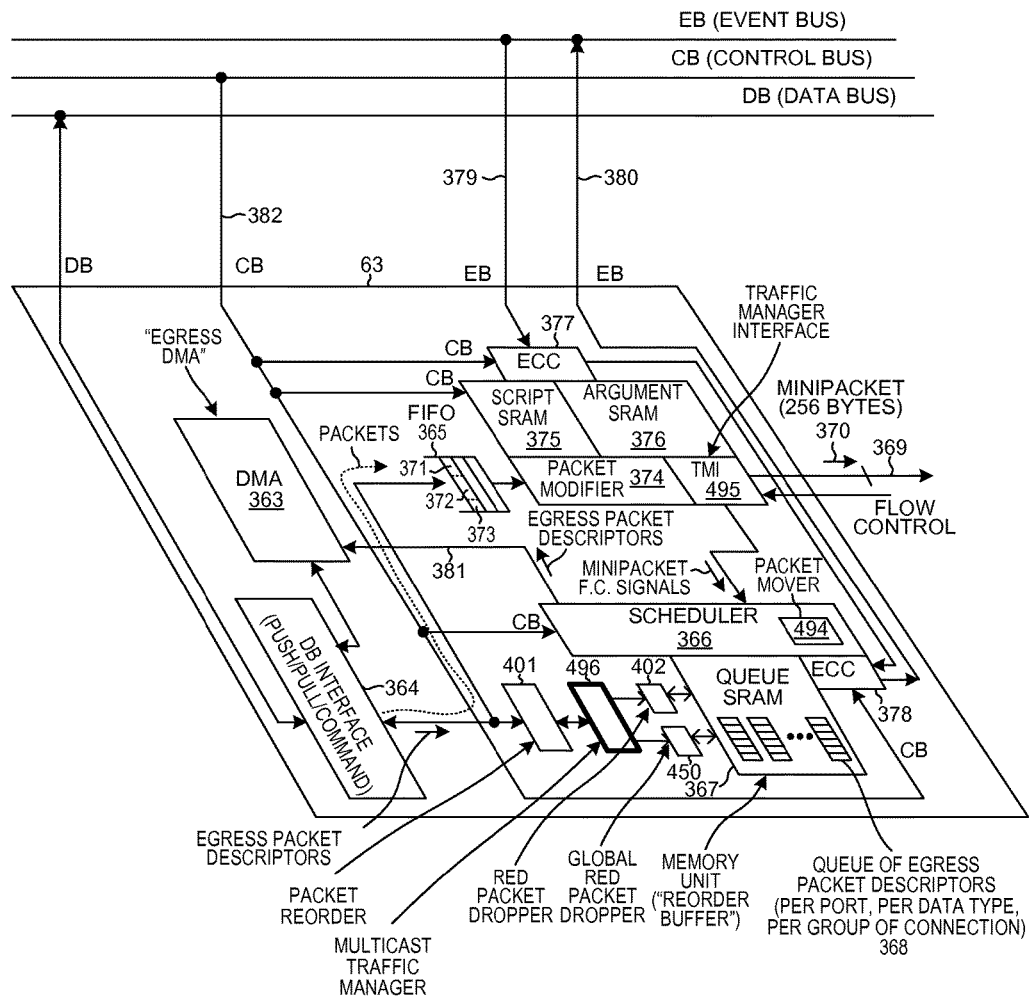
FIG. 12 is a diagram of egress NBI island 63.

FIG. 12 is a diagram of egress NBI island 63. In the operational example, ME island 66 instructs the egress NBI island 63 to transmit a packet by supplying the egress NBI island with an egress packet descriptor of the packet to be transmitted. The ME island supplies the egress packet descriptor to the egress NBI island by issuing a transmit packet command across the configurable mesh data bus and to the packet reorder block 401. The packet reorder block 401 responds by pulling the packet descriptor from the ME island across the configurable mesh data bus. In this way, multiple egress packet descriptors enter packet reorder block 401. These egress packet descriptors are reordered so that the descriptors for the packets of a flow are in proper sequence. The scheduler 366 receives the properly ordered egress packet descriptors and pushes them onto appropriate queues in queue SRAM 367. Each such queue of egress packet descriptors is per port, per data type, per group of connections. Reference numeral 368 identifies one such queue. Packets of a connection in this case share the same set of source and destination IP addresses and TCP ports. Scheduler 366 schedules packets to be transmitted by popping egress packet descriptors off the queues in appropriate orders and at appropriate times, and by supplying the popped egress packet descriptors via conductors 381 to the DMA engine 363.

The ingress NBI island maintains and stores a number of buffer lists. One of the buffer lists is a free buffer list. Packet data is received from an ingress MAC island into the ingress NBI island and is stored in SRAM 322. Individual portions of the packet data are stored in buffers in main memory. Each buffer has an associated buffer ID. The packet data of a packet may occupy multiple buffers, where the buffer IDs for the buffers are in one of the buffer lists. The DMA 323 causes the portions of packet data to be written into their corresponding buffers in external memory. The DMA 323 uses the CPP bus to do this. The DMA 323 also sends an ingress packet descriptor to a CTM in the ME island. The ingress packet descriptor includes a PPI number that is associated with the header portion of the packet as stored in the CTM. The ingress packet descriptor also includes a buffer list identifier that identifies the buffer list of buffer IDs (that store the packet payload in main memory). The ingress packet descriptor is converted into an egress packet descriptor and is loaded into the queue SRAM of the egress NBI island. There are lists of such egress packet descriptors stored in the queue SRAM. When the packet is scheduled to be output from the IB-NFP, then the egress packet descriptor for the packet is sent to the DMA 363. The DMA engine 363 uses the buffer list identifier to obtain the buffer ID of the list from the ingress NBI island, and then uses the buffer IDs to read the associated packet data from the indicated buffers. The DMA engine 363 also uses PPI number to have the packet engine of the ME island return the header portion of the packet. The DMA engine 363 combines the header portion of the packet with data portions from the buffers and supplies the packet in sections via FIFO 365 to the packet modifier. The buffers that stored the packet data for the packet, at this point, are no longer used so their buffer IDs are recorded in a buffer descriptor memory in the DMA engine 363. There may be multiple such lists of buffer IDs in the buffer descriptor memory in the DMA engine 363. When the number of buffer IDs in this memory reaches a predetermined threshold condition, an event is generated. This event is output from the egress NBI island onto the event bus. The event is communicated through the event bus to the ME island. A microengine is alerted, and in response sends a CPP command to the DMA engine 363 of the egress NBI island. This CPP command is an instruction to the DMA engine to send a number of the buffer IDs (recorded in the buffer descriptor memory of the DMA engine 363) across the CPP bus to the DMA engine 323 in the ingress NBI island. These buffer IDs are then pushed onto one of the free buffer lists. The DMA engine 363 also sends a complete command to the packet engine in the CTM of the ME island, instructing the packet engine to de-allocate the PPI number. In this way, the buffer IDs are allocated and de-allocated (or "freed"), and the PPI number are allocated and de-allocated. The amount of buffer space usable by a microengine is dynamically allocated, and is not fixed, but rather can increase and decreased over time as packets flow through the IB-NFP.

The egress packet descriptor is received by Multicast Traffic Manager (MTM) circuit 496. Multicast packet transmission is performed with the help of software executing on a micro engine within a micro engine island near the CTM. The software is used to aid the memory management in a network flow processor including multiple network block interfaces, where each network block interface may be responsible for sending multicast packets to one or more destinations. In operation, software reserves one of the buffer lists queues for multicast packets. There is no hardware restriction on what buffer list user used for multicast packets. Two bits in a packet ready command and a packet processing complete command are used to support software aided multicast operations. In one embodiment the packet ready command is included in the egress packet descriptor.

FIG. 23 illustrates the contents of the packet ready command. The packet ready command includes the target field and token field. The target field indicates that the target of the command is the egress NBI. The token field indicates the multicast mode to be performed by the egress NBI. The token field stores a multicast value. The multicast value can be one of four values. The first value is 00, which indicates that a drop packet mode is to be performed by the egress NBI. The second value is 01, which indicates that a unicast packet mode is to be performed by the egress NBI. The third value is 10, which indicates that a unique packet multicast mode is to be performed by the egress NBI. The fourth value is 11, which indicates that a common packet multicast mode is performed by the egress NBI. Software executed by a ME (microengine processor) located near the CTM in the ME island performs various memory management tasks depending on the multicast value. The code being executed by the ME is referred to as "software".

The drop packet mode (also referred to as "update packet sequence number" mode) is used to keep track of sequence numbers maintained in both a first and a second network block interface. For example, in a network flow processor that includes multiple network block interfaces it is necessary to update packet sequence numbers in each network block interface regardless of which network block interface was utilized to transmit the packet. For example a packet may be transmitted utilizing a first network block interface. Without the use of the drop packet mode, the packet sequence number in a second network block interface would not be updated, which would result in incorrect packet sequencing by the second network block interface. To remedy this potential error in packet sequencing, a packet ready command including a multicast value indicating that a packet is being sent via the first network block interface is sent to the second network block interface, thereby causing the second network block interface to properly update the sequence number for the second network block interface. If it is the intention of the system software to drop the packet, then the packet must also be free from the CTM memory and the MU buffer descriptor returned to the free list.

The unicast packet mode is used when a single packet is to be transmitted to a single destination. For unicast packet mode the multicast value is set to 01 indicating that "free on last transfer" is set. In unicast packet mode, the network block interface is responsible to free the CTM packet buffer on the last pull ID request and to free the MU packet buffer by returning the buffer lists queue descriptor. In unicast packet mode the software running on the ME is not responsible for freeing any packet buffers.

In unique packet multicast mode unique CTM packet buffers and unique memory unit packet buffers are required for each packet. In unique packet multicast mode, "free on last transfer" is set. When "free on last transfer" is set the network block interface circuit will be responsible for freeing each of the CTM packet buffers and the software will maintain the multicast buffer list queue and free the buffer list queue after the last multicast packet sent.

The common packet multicast mode (also referred to as "identical packet multicast mode) is used when a single packet is to be transmitted to multiple destinations. For common packet multicast mode the multicast value is set to 11 indicating that the free on last transfer is not set. In the common packet multicast mode the network block interface will not free the CTM packet buffer and will not free the MU packet buffer, but will return the buffer lists queue descriptor. In common packet multicast mode a single CTM packet buffer and a single and MU packet buffer are used to store the packet. Software running on the ME harvests the return buffer descriptors from the multicast buffer list queue. Software will free the CTM packet buffer and the MU packet buffer after harvesting all the buffer descriptors for the multicast packet once the transmission of the multicast packet is complete.

If a multicast packet is sent to a queue that is full and the drop bit is set and the free on last transfer is set the network block interface will drop the packet. The network block interface will free the CTM packet buffer using the free packet command and return the buffer descriptor to the multicast buffer list queue for software processing. The free packet command is shown in FIG. 22. If the network block interface cannot accept the packet ready command and drop it is allowed the network block interface will send the CTM a free packet command to free the packet buffer in the CTM memory and send the MU address back to the network block interface. In response to receiving the free packet command, the CTM will send the network block interface a signal only free packet command that contains the memory pointer for the packet that was freed.

If a multicast packet is sent to the queue that is full and the drop it is said and the free on last transfer is not set the network block interface will drop the packet descriptor but will not free the packet. The free packet command is sent to the CTM with the token field indicating that the packet should not be freed. The network block interface will return the buffer descriptor to the multicast buffer list queue for software processing.

If a multicast packet is sent to the queue that is full and the drop is not set the network block interface will proceed to retry the packet using the packet processing complete command. The packet processing complete command as shown in FIG. 21. When the network block interface cannot accept the packet ready command the network block interface will send the CTM a packet processing complete command indicating that the packet ready command should be retried at a later point in time. The packet processing complete command also includes a multicast value.

A packet engine in the CTM will inform the network block interface when a packet processing has been completed by ME on a particular packet and the packet is ready for transmission. The packet engine does this by sending a packet ready command to the network block interface indicating that the packet is ready for transmission. A packet start offset is based on the packet modifier bypass bit. If the packet modifier bypass bit is set any arbitrary packet start offset starting from byte 8 to 512 is supported. To achieve this, seven bits of the packet start offset are formed using two bits from the data master island and five bits from the length field. The seven bits provide the four byte alignment of the packet in the CTM. Within this four byte alignment, a byte alignment is achieved by using two bits of address field. If the packet modifier bypass is not set, two bits from data master island and forbids from the length field provide that the byte alignment from byte 8 to 504.

Figure 13:
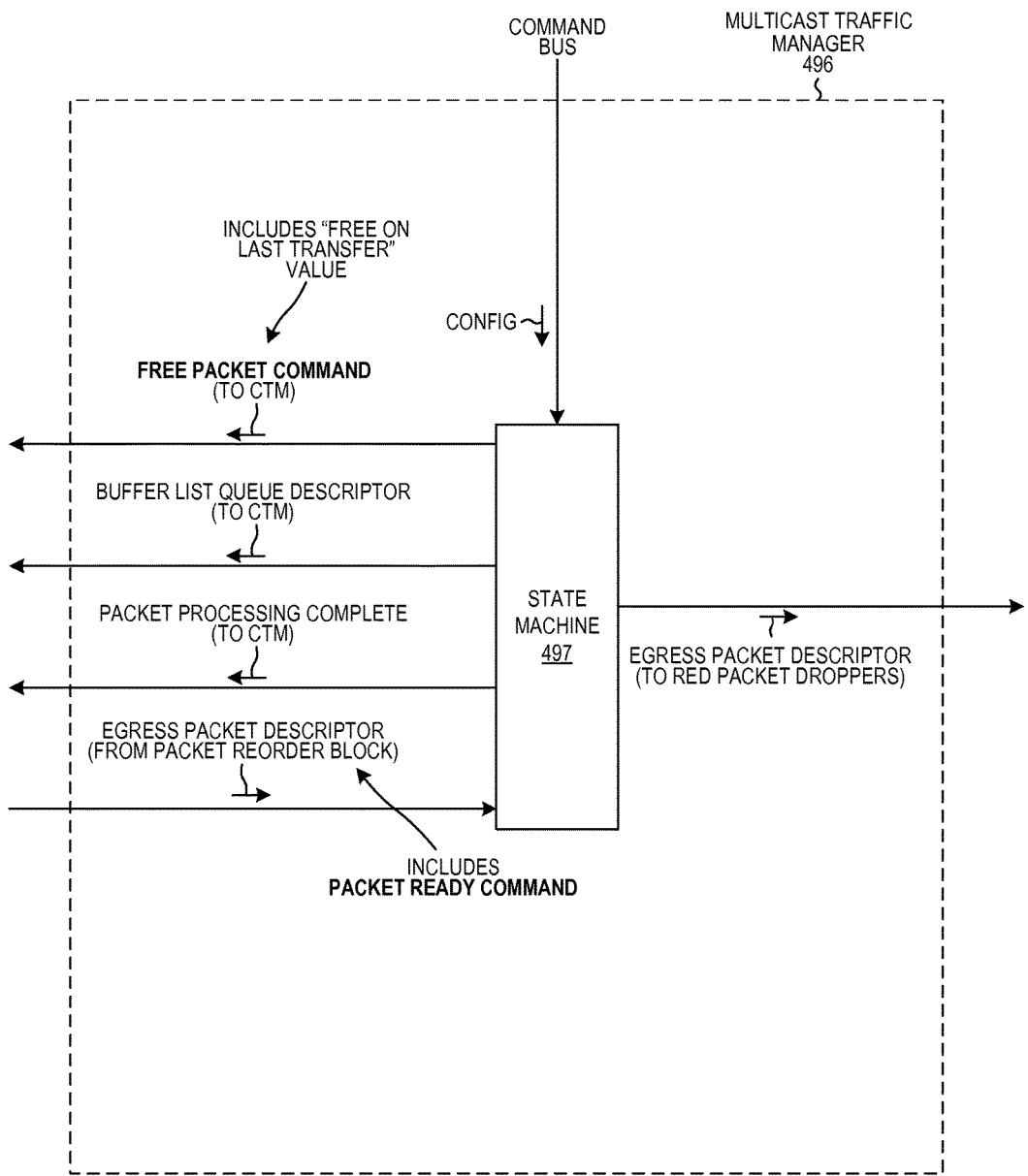
FIG. 13 is a diagram of a Multicast Traffic Manager (MTN) 496.
Figure 14:
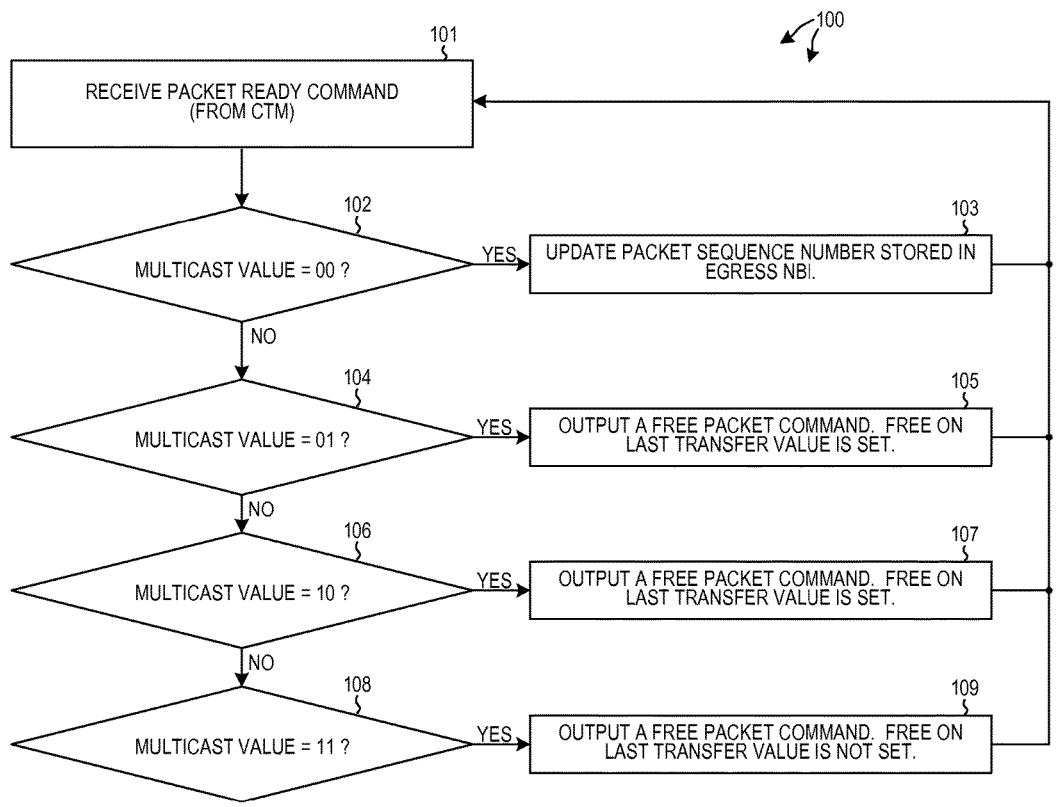
FIG. 14 is a flowchart 100 illustrating the operation of MTN 496.

FIG. 13 is a diagram illustrating multicast traffic manager 496. Multicast traffic manager 496 includes a state machine 497. State machine 497 may be implemented by a lookup table, combinatory logic, or a combination of the two. State machine 497 receives egress packet descriptors from the packet reorder block within the egress NBI island. The egress packet descriptor includes the packet ready command. The operation performed by state machine 497 in response to receiving the egress packet descriptor is illustrated in FIG. 14. FIG. 14 is a flowchart 100 diagram illustrating the operation of the multicast traffic manager. In step 101, the multicast traffic manager receives a packet ready command from the CTM. In step 102 the multicast traffic manager determines if the multicast value included in the packet ready command is equal to 00. If the multicast value is equal to 00 the flowchart continues to step 103, where the packet sequence number stored in the egress NBI is updated. This indicates that the packet was transmitted by another NBI in the network flow processor.

If the multicast value is not equal to 00, the flowchart continues to step 104. In step 100 for the multicast traffic manager determines if the multicast values equal to 01. If the multicast value is equal to 01 the flowchart continues to step 105, where a free packet command is output by the egress NBI island. The free on last transfer value included in the free packet command set. A multicast value of 01 corresponds to unicast packet mode. In unicast packet mode, the network block interface is responsible to free the CTM packet buffer on the last pull ID request and to free the MU pointer by returning the buffer lists queue descriptor. In unicast packet mode the software is not responsible for freeing any packet buffers. In step 106 the multicast traffic manager determines if the multicast value is equal to 10. If the multicast values equal to 10 the flowchart continues to step 107, where the free packet command is output. The free on last transfer value is set within the free packet command. A multicast value of 10 indicates unique packet multicast mode. In unique packet multicast mode the network block interface circuit will be responsible for freeing each of the CTM packet buffers and the software will maintain the multicast buffer list queue and free the pointer after the last multicast packet sent. If the multicast value is not equal to 10 the flowchart continues to step 108. In step 108 the multicast traffic manager determines if the multicast values equal to 11. If the multicast values equal to 11 the flowchart continues to step 109, where a free packet command is output. The free on last transfer value is not set within the free packet command. In multicast value 11 indicates a common packet multicast mode. In the common packet multicast mode the network block interface will not free the CTM packet buffer and will not free the MU packet buffer, but will return the buffer lists queue descriptor. In common packet multicast mode a single CTM packet buffer and a single and MU packet buffer are used to store the packet. Software harvests the return buffer descriptors from the multicast buffer list queue. In one embodiment, the software harvests the return buffer descriptors via event packets communicated across an event bus the passes through both the egress NBI island and the ME island. Software will free the CTM packet buffer and the MU packet buffer after harvesting all the buffer descriptors for the multicast packet once the transmission of the multicast packet is complete. After completing step 109 all possible multicast values of the exhausted and the flowchart chart 101.

Figure 15:
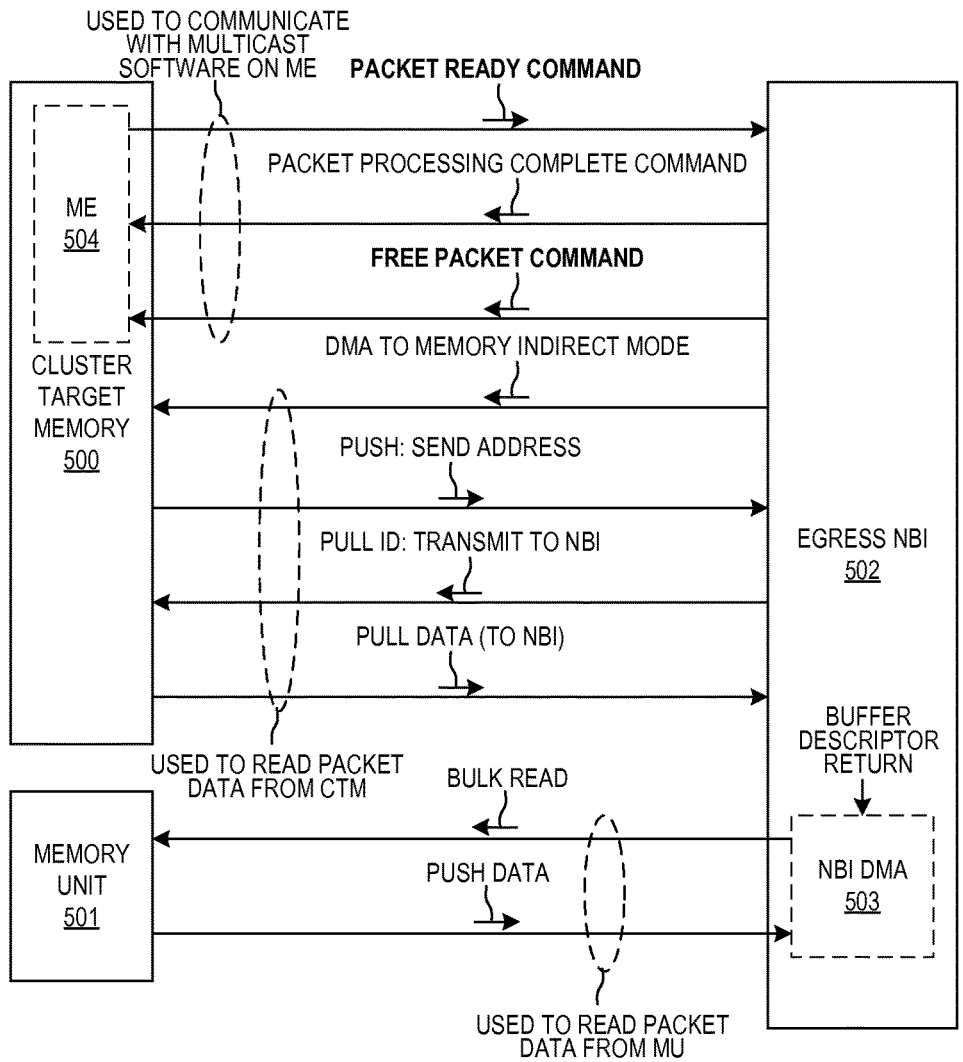
FIG. 15 is a diagram Multicast Traffic Management system.

FIG. 15 is a simplified diagram of the commands communicated between an egress NBI 502, a cluster target memory 500, and a memory unit 501. A packet descriptor is stored in the egress NBI island descriptor memory and portions of the packet associated with the packet descriptor is stored in one or more locations. The one or more locations are taken from a group including the cluster target memory, internal SRAM memory, or external DRAM memory. The SRAM and DRAM memory are accessed through a memory unit (MU) island. The egress NBI island request the packet data from the appropriate CTM or MU. The egress NBI island will schedule the packet transmission based on the scheduling algorithms programmed into the scheduler of the egress NBI island. The packet data is transferred in segments to the egress NBI island on pull or push data buses. Once the entire packet is received by the egress NBI island the packet is ready for transmission. The bulk read and push data commands are used to read packet data from the memory unit. The push data, the pull ID, and the pull data are utilized to read packet data from the CTM. The packet ready command, the packet processing complete command, and the free packet command are utilized to communicate between the egress NBI island and software running on microengine 504 within cluster target memory 500. As discussed above, the packet ready command, the packet processing complete command, and the free packet command allow software running on a ME to the free packet buffers and to maintain proper sequencing within multiple NBI islands.

Figure 16:
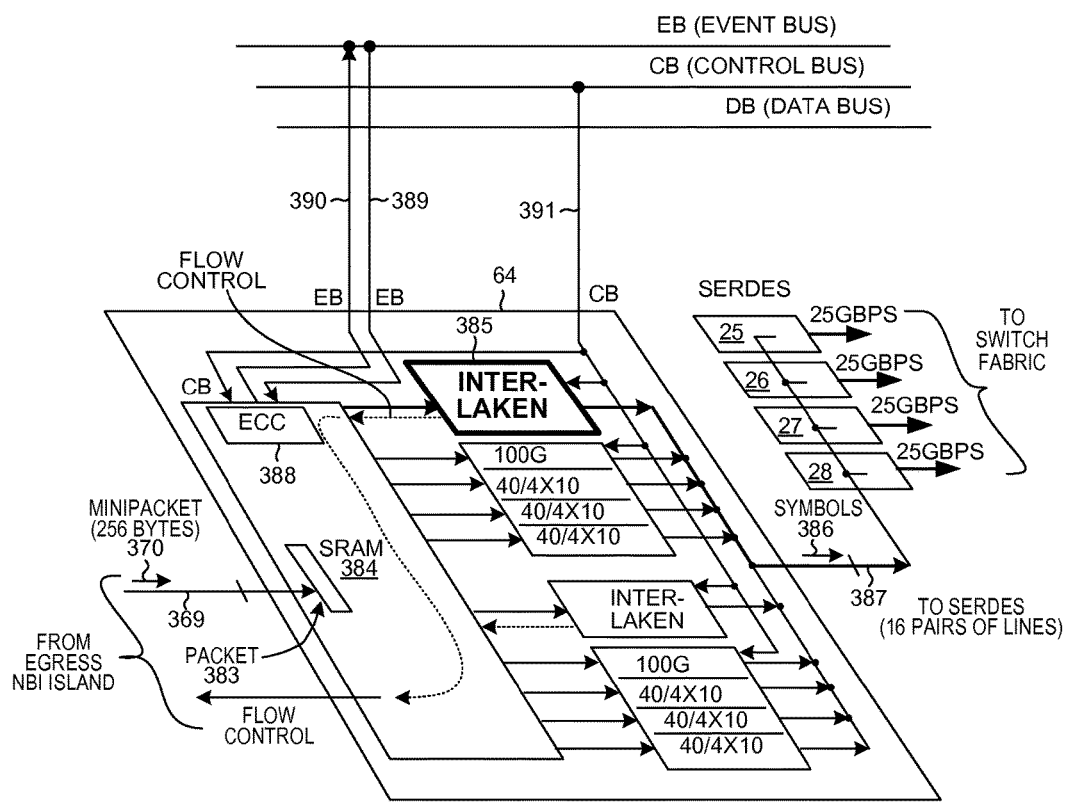
FIG. 16 is a diagram of egress MAC island 64 and SerDes blocks 25-28.

FIG. 16 is a diagram of egress MAC island 64. A packet 383 for transmission are received from egress NBI island 63 in the form of minipackets 370 via dedicated connections 369. The packets are buffered in SRAM 384. In the operational example, the packets to be output from the egress MAC island via are converted into symbols by Interlaken block 385. The resulting symbols 386 pass via dedicated connections 387 to the four SerDes I/O blocks 25-28. As described above in connection with FIG. 1, the four SerDes I/O blocks are coupled by SerDes connections 29 to switch fabric 9 of the MPLS router 1. ECC circuitry 388 of SRAM 384 is made a part of a local event ring via EB connections 389 and 390. Sub-circuits of MAC island are configurable. Configuration information for these sub-circuits is received from the control bus tree via connections 391.

Figure 17:
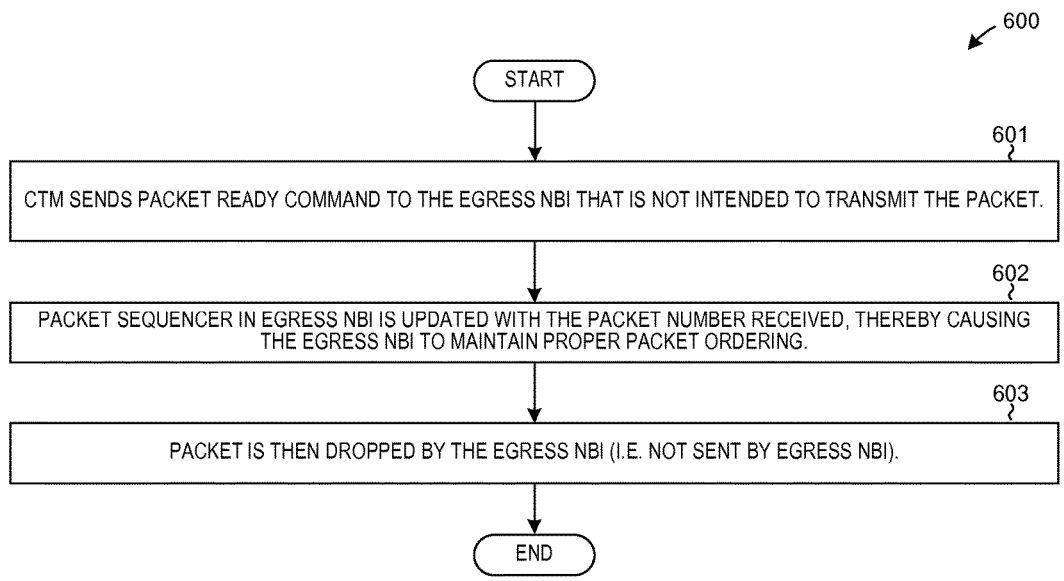
FIG. 17 is a flowchart 600 illustrating drop packet mode operation.

FIG. 17 is a flowchart 600 diagram illustrating the steps of the drop packet mode operation. In step 601 the CTM sends a packet ready command to an egress NBI island that is not transmitting a packet. The packet ready command indicates that the sequence number in the egress NBI island uses are updated because a packet was sent via another NBI island. In step 602, the packet sequencer in the egress NBI island is updated with the packet number received in step 601. This update of the packet number allows the egress NBI to continue to properly sequence packets. In step 603, the packet descriptor associated with the packet is then drop by the egress NBI, thereby causing the egress NBI to not send the packet (because the packets being sent by another NBI).

Figure 18:
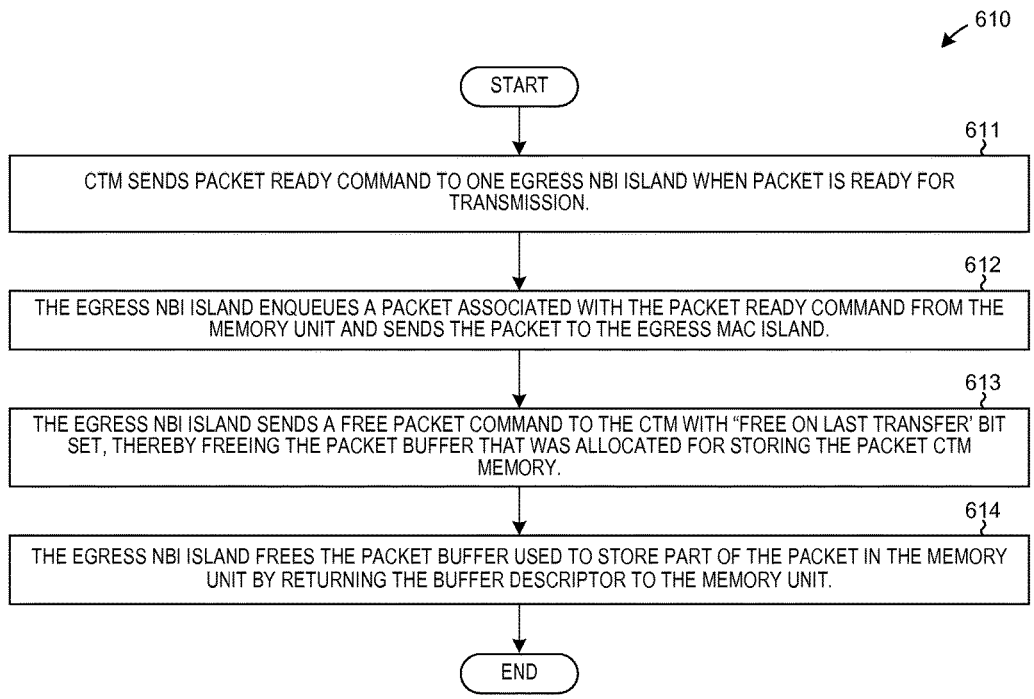
FIG. 18 is a flowchart 610 illustrating unicast packet mode operation.

FIG. 18 is a flowchart 610 diagram illustrating the steps of unicast packet mode operation. In step 611, the CTM sends a packet ready command to one egress NBI island when a packet is ready for transmission. In step 612, the egress NBI island enqueues the packet associated with the packet indicated in the packet ready command from the memory unit and cause the packet to be sent to the egress MAC island. In step 613, the egress NBI island sends a free packet command to the CTM. The free on last transfer bit is set within the free packet command. The set free on last transfer bit causes the packet buffer allocated to store the packet to be freed. In step 614, the egress NBI island frees the packet buffer used to store part of the packet in the memory unit by returning a buffer descriptor to the memory unit.

Figure 19:
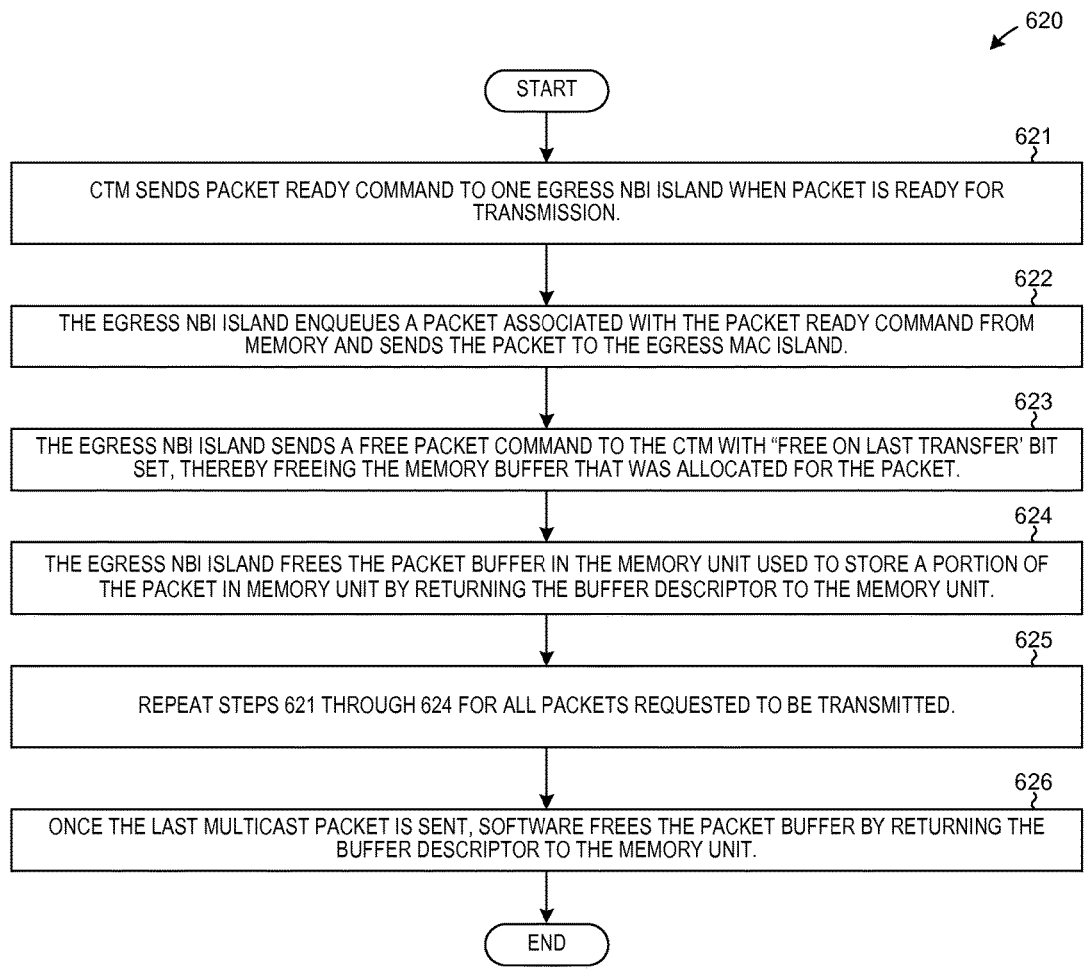
FIG. 19 is a flowchart 620 illustrating unique packet multicast operation.

FIG. 19 is a flowchart 620 diagram illustrating the steps of unique packet multicast operation. In step 621 the CTM sends a packet ready command to one egress NBI island when a packet is ready to be transmitted. In step 622 the egress NBI island enqueues the packet indicated in the packet ready command from the CTM memory and the memory unit and sends the packet to the egress MAC island. In step 623, the egress NBI island sends free packet command the CTM. The free on last transfer bit is set in the free packet command. The free packet command causes the packet buffer in the CTM that was used to store portion of the packet to be freed. In step 624, the egress NBI island frees the packet buffer in the memory unit used to store portion of the packet by returning the buffer descriptor to the memory unit. In step 625 step 621 through step 624 repeated until all requested packets are transmitted. In step 626, once the last multicast packet is sent the software running on the ME frees the packet buffer by returning the buffer descriptor to the memory unit. In step 633, the egress NBI island sends the free packet command in the CTM. The free on last transfer bit is not set in the free packet command. The packet buffer in the CTM allocated to store portion of the packet is not freed. In step 634, the egress NBI island sends a buffer descriptor to the microengine for each packet that is transmitted.

Figure 20:
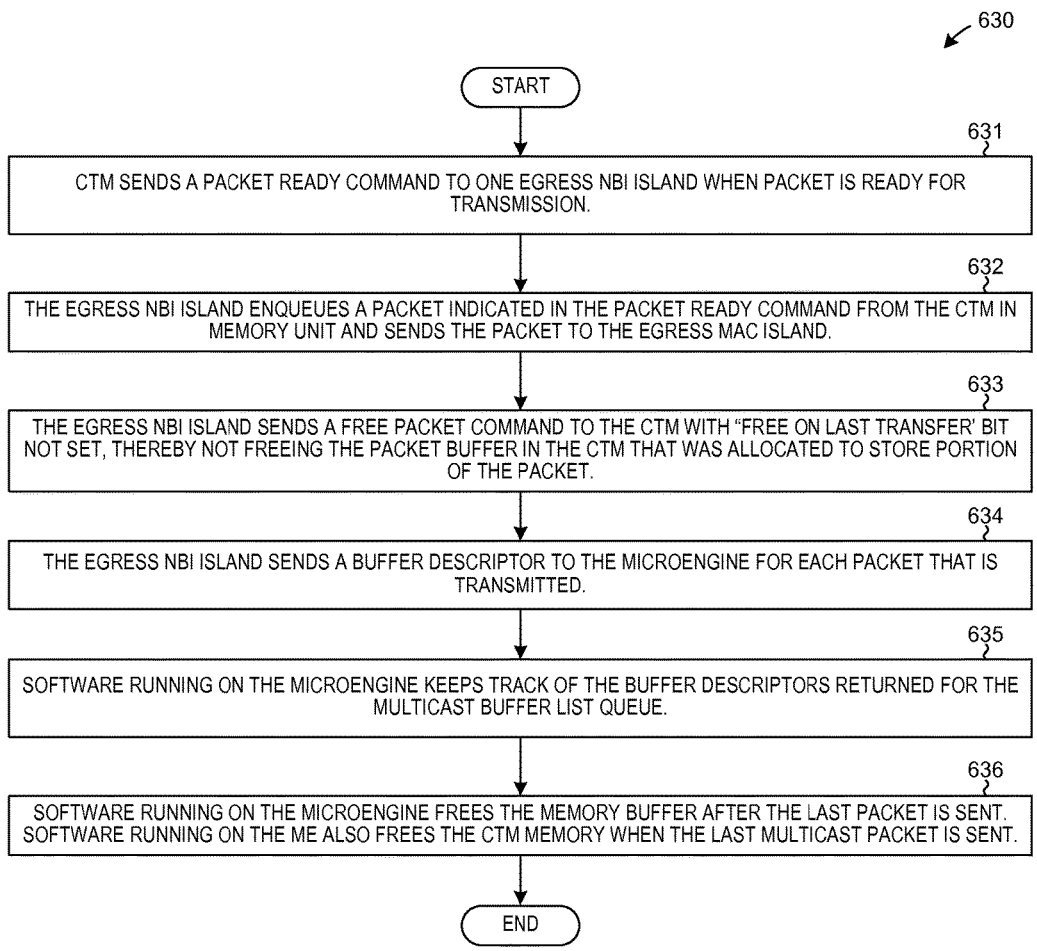
FIG. 20 is a flowchart 630 illustrating common packet multicast operation.

FIG. 20 is a diagram of flowchart 630 illustrating the steps of common packet multicast operation. In step 631 the CTM sends a packet ready command to one engress NBI island when a packet is ready for transmission. In step 632, the egress NBI island enqueues packet indicated in the packet ready command from the CTM and the memory unit and sends the packets of the egress MAC island. In step 633, the egress NBI island sends a free packet command to the CTM. The free on last transfer bit in the free packet command is not set. Therefore the packet buffer in the CTM that is allocated to store portion of the packet is not freed. In step 634, the egress NBI island sends a buffer descriptor to the microengine for each packet that is transmitted. In one example, the buffer descriptor is transmitted via an event packet on an event bus. In step 635, software running on the micro engine keeps track of the buffer descriptors returned for the multicast buffer list queue. In step 636, software running on the micro engine frees the packet buffer stored in the CTM memory and the packet buffer stored in the memory unit after the last packet is sent.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:
1. A method comprising:
(a) receiving a packet ready command from a memory system via a bus and onto a network interface circuit, wherein the packet ready command includes a multicast value;
(b) determining a communication mode as a function of the multicast value, wherein the multicast value indicates a plurality of packets are to be communicated to a plurality of destinations by the network interface circuit, and wherein each of the plurality of packets are unique;
(c) outputting a free packet command from the network interface circuit onto the bus, wherein the free packet command includes a Free On Last Transfer (FOLT) value, wherein the FOLT value indicates that the packets are to be freed from the memory system by the network interface circuit after the packets are communicated to the network interface circuit, and wherein (a) through (c) is performed by the network interface circuit.

2. The method of claim 1, further comprising:
(d) freeing the packet from the first memory system after communicating the packet to the network interface circuit, wherein the free packet command output in (c) is received by the first memory system, and wherein the freeing of (d) is initiated by the network interface circuit.

3. The method of claim 1, further comprising:
(d) outputting a buffer list queue descriptor after all the packets are sent, wherein the outputting of (d) is performed by the first memory system.

4. The method of claim 3, wherein the first memory system includes a processor, wherein the processor receives the buffer descriptor output from the network interface circuit for each packet transmission, and wherein the processor counts the number of buffer descriptors received and outputs a buffer list queue pointer after counting up to the first number of buffer descriptors.

5. The method of claim 1, wherein the determining of (b) involves:
(b1) using the multicast value to select a unique packet multicast mode; and
(b2) in response to (b1) generating the free packet command including the FOLT value, wherein (b1) and (b2) are performed by the network interface circuit.

6. The method of claim 1, wherein the packet is an IP (Internet Protocol) packet.

7. The method of claim 1, wherein the memory system includes a processor, and wherein the processor outputs the packet ready command received in (a) and receives the free packet command output in (c).

8. The method of claim 7, wherein the memory system includes a first memory unit and a second memory unit, wherein a first portion of the packet is stored in the first memory unit and wherein a second portion of the packet is stored in second memory unit, and wherein the processor executes code that updates a free buffer list within the second memory unit where a portion of the packet is stored, and wherein the processor does not fetch instructions.

9. The method of claim 8, wherein the processor causes each packet to be sent to each destination, and wherein the processor causes a portion of each packet to be freed from the second memory system.

10. The method of claim 1, wherein the packet ready command includes a field that indicates the first number of destinations.

11. The method of claim 1, wherein the packet ready command includes an identifier of a requestor, wherein the free packet command output in (c) is communicated from the network interface circuit to the requestor.

12. The method of claim 1, wherein the determining of (b) involves supplying the multicast value to a state machine and in response (i) generating the FOLT value, (ii) generating a free packet command, and (iii) inserting the FOLT value into the free packet command.

13. The method of claim 1, wherein the network interface circuit is a Network Block Interface (NBI) island, wherein the memory system is included in a MicroEngine (ME) island, and wherein the bus is a Command/Push/Pull (CPP) bus.

14. The method of claim 1, wherein the network interface circuit does not free any portion of the packets from the second memory system.

15. A method, comprising:
(a) outputting a packet ready command from a first memory system via a bus and onto a network interface circuit, wherein the packet ready command includes a multicast value, wherein the multicast value indicates a plurality of packets are to be communicated by the network interface circuit to a first number of destinations;

(b) receiving a free packet command from the network interface circuit via the bus, wherein the free packet command includes a Free On Last Transfer (FOLT) value, wherein the FOLT value indicates that each packet will not be freed from the first memory system by the network interface circuit after the packet is communicated to the network interface circuit;

(c) causing each packet to be communicated to each of the first number of destinations; and (d) freeing a memory space within the first memory system used to store a portion of each packet after each packet has been transmitted, wherein (a) through (d) is performed by the first memory system.

16. The method of claim 15, wherein the first memory system includes a processor, wherein a first portion of the packet is stored in the first memory system, wherein a second portion of the packet is stored in the second memory system, and wherein the processor does not fetch instructions.

17. The method of claim 16, further comprising:

(e) freeing a memory space within the second memory system used to store the second portion of one packet, wherein steps (a) through (e) are performed by the processor.

18. The method of claim 16, wherein the processor receives a buffer descriptor for each destination the packet is communicated to, wherein the processor maintains a count of buffer descriptors, wherein the processor updates a buffer list queue pointer after the first number of buffer descriptors are counted.

19. The method of claim 16, wherein the processor does not fetch instructions, and wherein the packet is an Internet Protocol (IP) packet.

20. The method of claim 15, wherein the first memory system is included in a MicroEngine (ME) island, wherein the network interface circuit is included in a Network Block Interface (NBI) island, wherein the bus is a Command/Push/Pull (CPP) bus, and wherein the ME island, NBI island, and CPP bus are part of an Island-Based Network Flow Processor (IB-NFP).

* * * * *